March 8, 1960  G. L. HERTER  2,927,391
FISH CALLING DEVICE
Filed Jan. 17, 1958
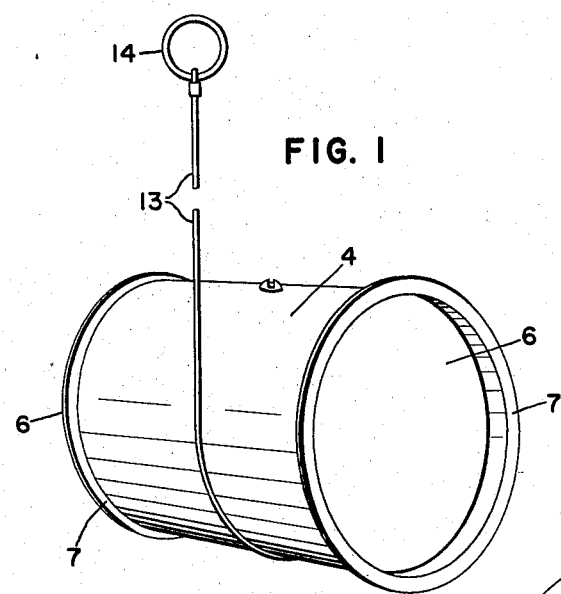
FIG. 1
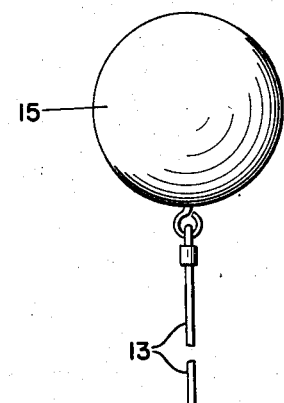
FIG. 3
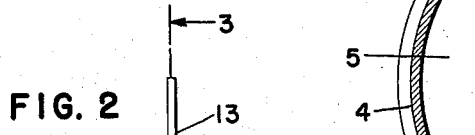
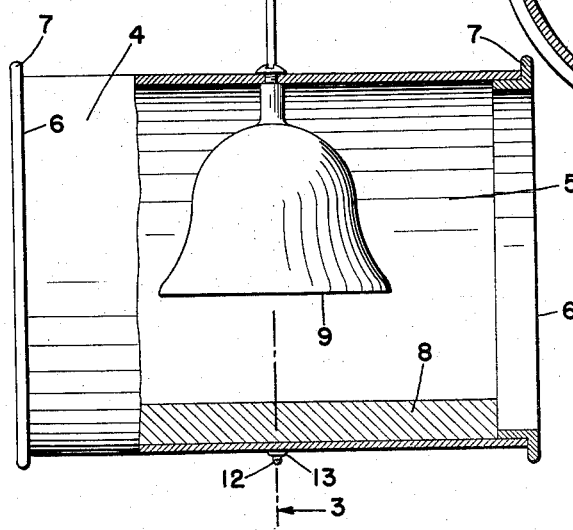
FIG. 2
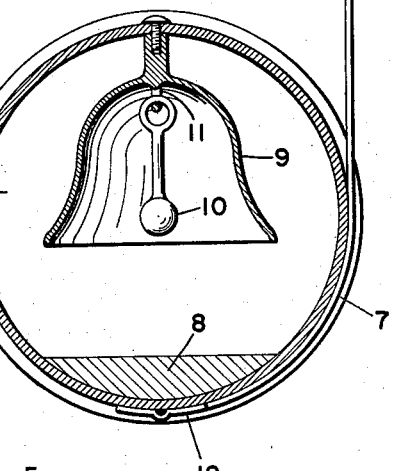
INVENTOR.
GEORGE L. HERTER
BY
ATTORNEY

2,927,391
FISH CALLING DEVICE

George L. Herter, Waseca, Minn.

Application January 17, 1958, Serial No. 709,605

3 Claims. (Cl. 43—17.1)

This invention relates broadly to sounding devices and more particularly to a fish calling device designed for underwater operation and activated manually or by wave action.

The principal object of this invention is to provide a fish calling device that will successfully call fish to its operational and adjacent area by sound only.

Another object of this invention is to provide a fish calling device that is simple to operate and positive in its action, requiring no more than movement of said device to impart sound thereto.

A still further object of this invention is to provide a fish calling device that is inexpensive to manufacture and which embodies no supplemental power source to produce sound such as dry batteries and which will never need servicing, recharging or the like.

These and other objects of the invention will become apparent from the following specification and claims taken in conjunction with the appended drawings which form a part of this application and in which, throughout the several views, like characters indicate like parts.

To the above end, generally stated, the invention consists of the following devices and combination of devices hereinafter described and defined in the claims.

Referring to the drawings:

Fig. 1 is a perspective view of the invention in operational position,

Fig. 2 is a side view with parts broken away, and

Fig. 3 is a sectional view in end elevation taken on the line 3—3 of Fig. 2, showing also a modification of the terminal end of the operational means.

It has been determined that fish have certain sensory values that causes them to be attracted by certain sounds or light conditions and attempts have long been made to produce such sounds that would call fish in to a specific area by means that did not violate laws governing the taking of fish by commonly used angling procedures. Previous efforts in this direction have generally been directed to the simulation of certain buzzing insect sounds accomplished by means of electrical apparatus requiring the use of dry cell batteries that are obviously short lived and frequently require replacement. Extensive tests of such devices have disclosed a vary low percentage of success, particularly on game fish species, to call said fish to the operational area of the device as will hereinafter be described.

The numeral 4 indicates a hollow cylindrical body member that affords a housing chamber 5 for the sounding elements mounted therein a description of which will follow in due course. This cylindrical body member 4 is provided with end caps 6 having relatively wide upstanding peripherial flanges 7. Manufacturing procedures will dictate the mode of application of the end caps 6 to the body member 4 and while the sounding equipment will never need servicing it may be well to provide access to the interior of the chamber by making one of said end caps removable as shown in Fig. 2. It is important to note however, that the chamber 5 must be watertight and accordingly in such construction, a gasket, not shown, will necessarily become a necessary component of the removable end cap 6. Generally speaking however, in the commercial form of the device, once the sounding equipment is in place, the cylindrical body member may be sealed by conventional methods as no servicing thereof is necessary.

Rigidly attached or formed integral with the chamber 5, is a relatively heavy longitudinally extended weight member 8 that extends substantially the full length of the chamber 5. By virtue of said weight when the body is normally at rest on the flanges 7, said weight and that portion of the body 4 which it covers, obviously becomes the bottom of the device taken as an entirety.

Rigidly attached to the top of the chamber 5 at its longitudinal and transverse centers is a depending bell-like member 9 having a pendulum-like striker 10 suspended from a fixed eye 11 in the upper end portion of said bell, said striker 10 being free to swing to and fro about its fixed axis in the form of the eye 11 under the combined action of gravity and momentum as will presently be described.

It will be understood that the specific gravity of the complete unit is such as to just sink the same in a body of water to normally rest on the bottom for rocking movements about its longitudinal axis on the flanges 7. Attached to the outside of the cylindrical body member 4 at the bottom thereof and substantially at its longitudinal center is a small stud 12 to which is attached one end of an operating cord 13 that extends from said stud 12 around the lower circumference of one side of the body member 4 and thence, as shown in Fig. 1, upwardly to the water surface and terminating in a finger ring 14 or the like to be held by the fisherman. It will thus be seen that with the operating cord 13 held taut, a slight upward pull and release by the fisherman in a boat or on any suitable support, will cause the device to rock back and forth about said longitudinal axis and by such rocking movements, cause the striker 10 to swing from side to side and strike the bell 9 to produce the desired ringing sound attractive to fish.

To enable the fisherman to have the use of both hands and to also maneuver a boat, with the call device in normal neutral position, the taut cord or line 13 can be attached to an anchored boat and thus activate the call device by means of wave action. As a further means to impart movement to the submerged unit, and as shown in Fig. 3, there is provided a float 15 that is attached to the cord 13 at a point whereby a said cord will be maintained taut between the float and submerged unit. The float 15 on the water surface will be activated by wave action which will in turn impart rocking movement to the sounding unit on the bottom of the body of water by virtue of the taut cord 13 connecting said float and said sounding unit.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. A fish calling device comprising in combination a submersible housing, end caps on said housing forming a watertight chamber in said housing, upstanding peripherial flanges integral with said housing affording rocker surfaces therefor, a pendulum sounding device depending into said chamber to produce sound when rocking movement about its longitudinal axis is imparted to said housing, weight means integral with the housing in spaced opposed relation to said pendulum sounding device, said weight means being of only sufficient mass as to overcome the specific gravity of said housing and submerge the same in a body of water to the bottom thereof, an operating cord connected at one end to the bottom of said housing and beneath said weight means, and extending circumferentially around the housing and upwardly to the water surface whereby rocking movement is imparted to the submerged device by an upward pull and release of said taut cord to activate the sounding device mounted in said watertight chamber.

2. A fish calling device comprising in combination, a submersible cylindrical hollow housing, end caps having upstanding peripherial flanges closing the end portions of said housing to thus afford a watertight chamber in said housing, a sounding device in the form of a bell rigidly attached and dependingly disposed in said chamber, a pendulum striker in combination with said bell to swing freely about a vertical axis under the combined action of gravity and momentum, a weight member in said chamber circumferentially opposite the fixed mounted position of the bell to thus maintain the depending position of said bell and the perpendicular neutral position of said pendulum striker, said weight having just sufficient mass and density to overcome the specific gravity of the housing and submerge the same in a body of water to normally rest on the said flanges in a horizontally disposed plane for rocking movements on said flanges, an operating cord connected to said housing substantially at the bottom thereof, said cord passing from its anchor point about the lower outer circumferential surface of said housing and thence upwardly to the water surface, a finger piece on the upper terminal of said cord whereby by the upward pull and release of the taut cord by an operator will impart rocking movements to the submerged housing to impart swinging movement to the pendulum whereby it strikes and produces sound as it strikes the bell.

3. The structure defined in claim 2 wherein the upper terminal end of the cord is connected to a float said cord being held taut and only of sufficient length as to position said float in perpendicular alignment with the submerged housing, whereby wave action on the float will impart movement to the connected housing.

References Cited in the file of this patent

UNITED STATES PATENTS

| | | |
|---|---|---|
| 1,726,736 | Good | Sept. 3, 1929 |
| 2,577,229 | Carness | Dec. 4, 1951 |
| 2,757,475 | Pankove | Aug. 7, 1956 |